March 12, 1957     F. M. TOMPKINS     2,784,919

FISHING REEL

Filed Aug. 24, 1953

INVENTOR
Francis M. Tompkins
BY Robert M. Dunning
ATTORNEY

United States Patent Office 2,784,919
Patented Mar. 12, 1957

2,784,919

FISHING REEL

Francis M. Tompkins, St. Paul, Minn.

Application August 24, 1953, Serial No. 376,002

1 Claim. (Cl. 242—84.1)

This invention relates to an improvement in fishing reel and deals particularly with a type of reel from which the line may be stripped while the reel drum remains stationary.

During recent years the use of fishing reels having stationary drums has become increasingly popular. Many of these reels have their axis at right angles to the axis of the rod, the winding operation and the reel support rotate ninety degrees so that the reel axis is parallel with the rod during the casting process. In other words the reel must be rotated at ninety degrees between the casting operation and the guiding operation.

An object of the present invention resides in the provision of a reel of the same general type but which does not require the rotation of the reel between the casting and winding operations. The structure is so devised that the line may unwind from the reel without pivotally supporting the reel.

A feature of the present invention resides in the provision of a spinning reel which is less complicated and less expensive to construct than spinning reels of previous types. Due to the fact that the reel support need not pivot, the construction is greatly simplified.

A feature of the present invention resides in the provision of a fishing reel having a hook-shaped guide of wire rod or similar material extending from the reel support in a direction parallel to the axis of the reel. This hook-shaped rod acts as a guide for the line during the casting operation and permits the line to be stripped off of the reel without rotating the reel. Due to the fact that the hook-shaped member is rounded in cross-section the guide provides little friction or resistance to the withdrawal of the line even though the guide causes the line to bend at ninety degrees.

A feature of the present invention resides in the fact that the line may be quickly and easily hooked upon, or unhooked, from the guide. In order to accomplish this result it is only necessary to pull the line over the end of the hook. If there is a strain upon the line as would be the case if a fish took the bait immediately after it was cast, the line may be unhooked from the guide by holding the line against the pole at a point spaced from the reel, thus providing the necessary slack in the line to permit the unhooking operation.

These and other objects and novel features of the invention will be more fully and clearly set forth in the following specification and claims.

In the drawings forming a part of the specification;

Figure 1:
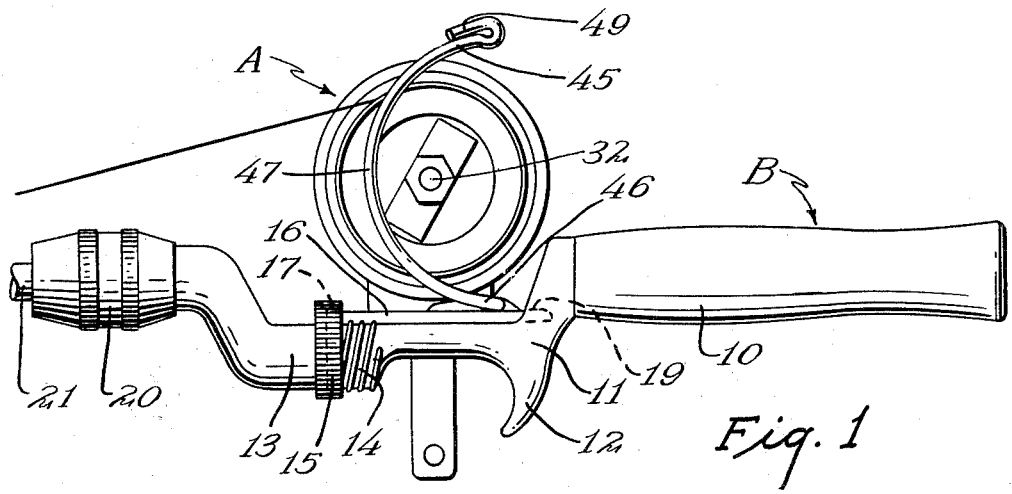
Figure 1 is a side elevational view of the reel in place upon a conventional fish pole.

In the particular form of construction illustrated the reel is directly connected to the operating crank so as to be rotated directly rather than through gearing. This arrangement is employed because of its simplicity and low cost. It is believed obvious, however, that the reel could be driven through suitable gearing if such an arrangement were preferred.

The reel is indicated in general by the letter A and is removably mounted upon a pole B. The fishing pole B is of any suitable common type, one such construction being illustrated. In the particular arrangement illustrated the pole includes a handle 10 which is connected to a yoke offset from the axis of the handle 10. A finger guard 12 makes the pole somewhat easier to operate. The yoke 11 includes a generally cylindrical portion 13 which is threaded at 14. A threaded sleeve 15 is provided upon the threaded portion 14, the sleeve 15 extending over the base bracket 16 of the reel A. In other words the upper surface of the yoke 11 is flattened to accommodate the base strip 16 of the reel and the sleeve 15 includes a flange 17 which extends over the strip 16 to hold it in place. The opposite end of the strip 16 extends into a recess 19 near the handle 10.

The rod B also includes a coupling 20 to detachably connect the handle portion of the rod to the rod shaft 21. All of this construction is old in the art.

Figure 3:
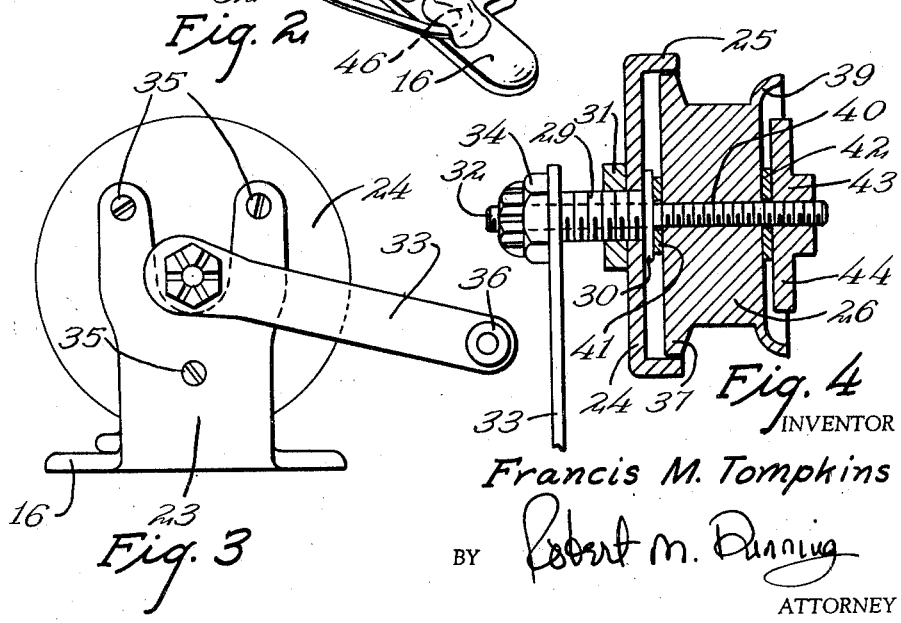
Figure 3 is a rear elevational view of the reel.
Figure 4:
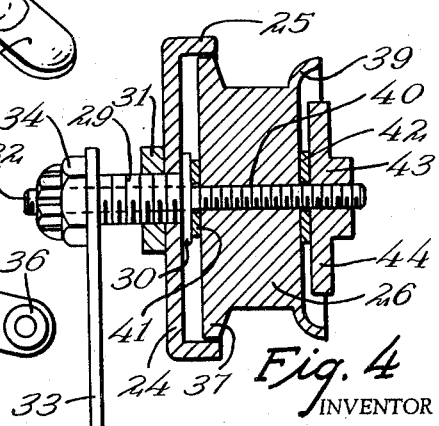
Figure 4 is a cross-sectional view through the reel showing typical arrangement of parts.

As indicated in Figure 3 of the drawings a mounting plate 23 is provided at right angles to the mounting strip 16. This plate 23 is secured to a disc 24 having a cylindrical marginal flange 25 thereupon. The flange 25 is designed to overlie one side of the reel spool 26 and to prevent the fishing line 27 from extending over the adjoining end of the reel spool. A threaded sleeve 29 extends through the axis of the disc 24 and is provided with a head 30 on the inner surface of the disc. A locking nut 31 is threaded onto the sleeve 29 to hold the sleeve in fixed position to the disc 24.

The shaft 32 extends through the sleeve 29 and is secured to one end of the crank arm 33. The crank arm is so supported upon the shaft 32 that it will not rotate with respect thereto. A nut 34 on the crank arm 33 is threaded onto the shaft 32 and is held from rotation with respect thereto by a pin or other suitable means.

In Figure 3 of the drawings it will be noted that the mounting plate 23 straddles the sleeve 29 and is secured thereto by bolts 35 or other suitable means. The crank arm 33 is provided with a handle 36 at its extremity by means of which the crank may be rotated.

The reel spool 36 is provided at one end with a flange 37 which extends within the flange 25 of the disc 24 and is in close spaced relation thereto. This arrangement prevents the line from entering the space between the flange 25 and the reel. The spool 26 is also provided with a curved flange 39 at its other extremity, this flange 39 permitting the line to be stripped from the reel without requiring rotation of the reel.

The body of the reel spool is provided with a threaded aperture extending through its axis. This aperture being indicated at 40. The washer 41 preferably encircles the shaft 32 between the sleeve head 30 and the body of the spool. A second washer 42 ordinarily encircles the shaft 39 exteriorly of the reel spool 26. A nut 43 is threaded onto the end of the shaft 32 to hold the reel in place. In preferred form the nut 32 is provided with laterally extending wings 44 so that the nut may be removed if desired without the use of tools.

Figure 2:
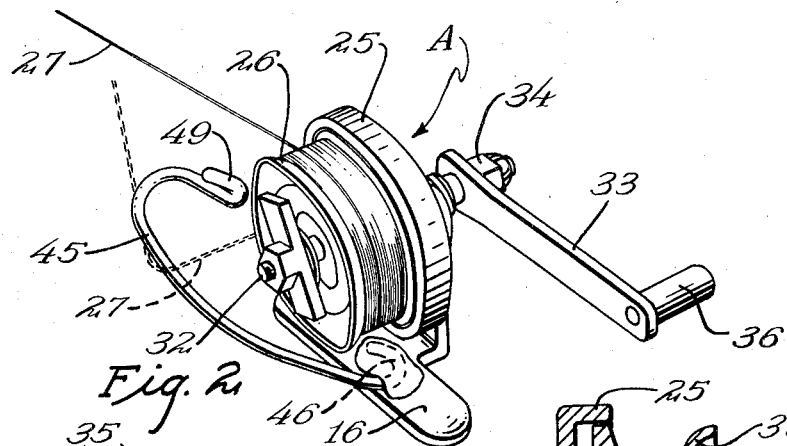
Figure 2 is a perspective view of the reel.

A generally hooked-shaped loop 45 is attached to the base strip 16 by welding or other suitable means. The anchored end 46 of the strip 45 is secured rearwardly of the center of the reel as shown in Figures 1 and 2. The arm 45 is rounded in shape and has its center portion 47 extending substantially vertically and near the center or axis of the shaft 32 but axially spaced therefrom. In other words the rod 45 extends forwardly and upwardly to its center point 47 and then bends upwardly and rearwardly above the center. The extremity of the arm is folded upon itself at 49 to provide a rounded extremity over which the line may be slipped with ease.

The hooked-shaped loop is so arranged that when the line 27 is looped thereover, as shown in dotted outline of Figure 2 of the drawings, the line may be pulled over the reel flange 39 with no difficulty. In other words the line will be stripped from the reel over the flange 39 if the bait is cast and this action will take place with virtually no friction upon the line. As a result a very light bait or lure may be cast considerable distances without difficulty.

After the casting operation, the line is merely slipped over the free end 49 of the arm 45 and the line may then be wound upon the reel by rotation of the crank arm 33. The ease with which the line may be hooked upon, or removed, from the hooked-shaped rod is of importance as this operation must occasionally be accomplished in a short period of time.

In accordance with the patent statutes, the principles of construction and operation of the fishing reel have been described and while it has been endeavored to set forth the best embodiments thereof, it is desired to have it understood that obvious changes may be made within the scope of the following claim without departing from the spirit of the present invention.

I claim:

A fishing reel including a rotatable spool having two sides, a disc extended along one side of said spool, a mounting base secured to said disc, a flange on said disc encircling one edge of said spool, means rotatably supporting said spool on said disc including shaft means extending through said disc, reel spool rotating means secured to said shaft means for rotating the same, and a generally rounded hook shaped arm having an upwardly and outwardly and upwardly and inwardly curved semi-circular central portion, said arm being secured at one end to said base and extending across the diametrical width of said spool and laterally away from said spool along a side thereof opposite the side along which said disc extends, the said semi-circular portion of said arm extending across the diametrical width of the said spool along the said side thereof serving to guide a fish line thereover during a stripping action of said line from said reel while said spool remains stationary.

References Cited in the file of this patent

UNITED STATES PATENTS

| | | |
|---|---|---|
| 1,755,195 | Stanley | Apr. 22, 1930 |
| 2,545,080 | Graham | Mar. 13, 1951 |
| 2,580,777 | Hewlett | Jan. 1, 1952 |
| 2,649,259 | Ulrich | Aug. 18, 1953 |

FOREIGN PATENTS

| | | |
|---|---|---|
| 380,254 | Great Britain | Sept. 15, 1932 |
| 907,774 | France | July 23, 1945 |
| 984,452 | France | Feb. 28, 1951 |
| 987,475 | France | Apr. 18, 1951 |